(12) United States Patent
Hagiwara

(10) Patent No.: US 6,990,240 B2
(45) Date of Patent: Jan. 24, 2006

(54) IMAGE PROCESSING APPARATUS

(75) Inventor: Shinichi Hagiwara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 606 days.

(21) Appl. No.: 09/886,113

(22) Filed: Jun. 22, 2001

(65) Prior Publication Data

US 2002/0001410 A1 Jan. 3, 2002

(30) Foreign Application Priority Data

Jun. 28, 2000 (JP) .................................... 2000-194962

(51) Int. Cl.
*G06K 9/36* (2006.01)

(52) U.S. Cl. ................................. 382/232; 382/244
(58) Field of Classification Search ................ 382/162, 382/166, 232, 244–251, 298; 358/426.13, 358/426.14, 444, 539
See application file for complete search history.

(56) References Cited

U.S. PATENT DOCUMENTS

| | | | |
|---|---|---|---|
| 5,086,487 A | 2/1992 | Katayama et al. | 382/232 |
| 5,267,052 A | 11/1993 | Bannai et al. | 358/444 |
| 5,412,486 A | 5/1995 | Bannai et al. | 358/444 |
| 6,426,771 B1 | 7/2002 | Kosugi | 348/222 |

FOREIGN PATENT DOCUMENTS

| | | |
|---|---|---|
| JP | 10108133 | 4/1998 |
| JP | 2001-069465 | 3/2001 |

*Primary Examiner*—Bhavesh M. Mehta
*Assistant Examiner*—Duy M. Dang
(74) *Attorney, Agent, or Firm*—Fitzpatrick, Cella, Harper & Scinto

(57) ABSTRACT

An image pickup apparatus having a simpler hardware configuration and capable of operating by a smaller power consumption. The apparatus has an image pickup device for producing image data by photographing an image, a first storage device for storing image data obtained by the image pickup device, a size reduction circuit for reducing the size of the image data stored in the first storage device after reading out the image data, a second storage device for storing, in a unit corresponding to a predetermined number of lines, the size-reduced image data obtained by the size reduction circuit, and a single compression circuit for alternately performing, by predetermined timing, first compression processing and second compression processing to obtain two kinds of compressed data representing one photographed image, the first compression processing including reading out the image data stored in the first storage device and compressing the image data without reducing the size, the second compression processing including compressing the size-reduced image data stored in the second storage device.

12 Claims, 11 Drawing Sheets

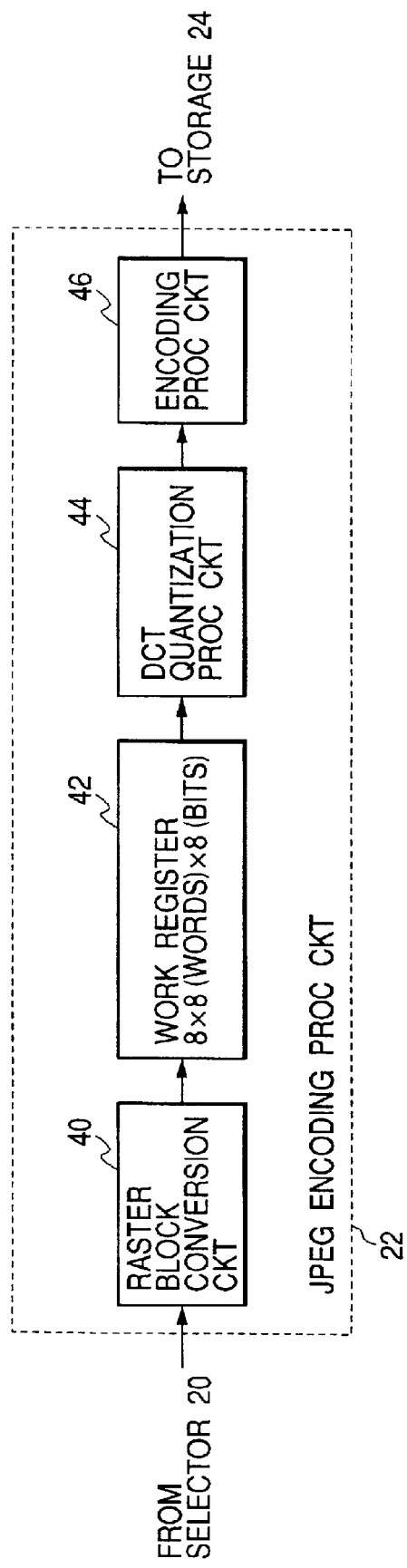

IMAGE PROCESSING APPARATUS

BACKGROUND OF THE INVENTION

1. Field of the Invention

The present invention relates to an image processing apparatus which compresses image data.

2. Related Background Art

In conventional digital cameras, the amount of data on a photographed image is reduced by an image compression technique such as one proposed by JPEG (Joint Photographic Experts Group) before being recorded on a recording medium or being output to a transmission path. FIG. 11 is a block diagram schematically showing the configuration of a conventional digital camera.

An image pickup unit 110 is constituted by a photographing lens, an image pickup device, and a circuit for driving the image pickup device. An optical image imaged by the photographing lens is converted into an electrical signal by the image pickup device.

An original image processing circuit 112 converts the image signal from the image pickup unit 110 into digital data, and performs, as a preparation for dark correction, extraction of pixel data from shaded portions and flaw position detection for flaw correction, and then writes data obtained at this stage a buffer memory 114.

The buffer memory 114 has such a capacity as to be capable of storing an amount of data corresponding to a plurality of frames each read out as a unit amount of photography data from the image pickup device of the image pickup unit 110. It is necessary to set the capacity of the buffer memory 114 to a substantially large value such that the continuous shooting operation, i.e., repeating the photographing operation a certain number of times in a short time period, is not limited by the speed of processing in following stages (format conversion, compression coding, recording on a recording medium).

The original image processing circuit 112 reads out the image data stored in the buffer memory 114 and performs processing for correction including shading correction, dark correction, and flaw correction.

An image processing circuit 116 performs, on image data output from the original image processing circuit 112, a well-known processing such as white balancing, color interpolation processing, and pseudo color processing.

A YUV conversion circuit 118 converts image data output from the image processing circuit 116 from RGB format into YUV format. A JPEG encoding processing circuit 120 performs JPEG compression coding on image data output from the YUV conversion circuit 118. A image size reduction processing circuit 122 forms a thumbnail image by reducing the size of image data output from the YUV conversion circuit 118. A JPEG encoding processing circuit 124 performs JPEG compression coding on the thumbnail image from the image size reduction processing circuit 122.

The groups of image data respectively compressed by the JPEG encoding processing circuits 120 and 124 are selected alternately or according to a suitable timing by a selector 126 to be supplied and written in a storage 128. The image data compressed by the JPEG encoding processing circuit 120 forms a main image mainly to be displayed, edited and printed, for example, while the image data compressed by the JPEG encoding processing circuit 124 forms a sub image mainly to be viewed in a search or viewed in a browsing manner, for example.

A control circuit 130 constituted by a microcomputer controls the section formed by the YUV conversion circuit 118, the JPEG encoding processing circuit 120, the image size reduction processing circuit 122, the JPEG encoding processing circuit 124, and the selector 126. The control circuit 130 adds attribute information, i.e., photography date information to the image data compressed by the JPEG encoding processing circuit 120 by setting the attribute data before and after the image data, and stores the image data with attribute information in the storage 128. The control circuit 130 controls the conditions of encoding in the JPEG encoding processing circuits 120 and 124 so that the amount of data after compression may be equal to the desired value.

An image size reduction processing circuit 132 reduces the size of image data output from the image processing circuit 116 to a displayed size and stores the reduced image data in a display memory 134. The image data stored in the display memory 134 is read out at a constant rate to be supplied to a liquid crystal display panel 136 to display thereon an image corresponding to the optical image incident upon the image pickup unit 110.

In the conventional art, a photographed image is read out from the buffer memory 114 to be stored as a main image in the storage 128 via the original image processing circuit 112, the image processing circuit 116, the YUV conversion circuit 118, the JPEG encoding processing circuit 120, and the selector 126. Thereafter, the same image is read out from the buffer memory 114 to be stored as a sub image in the storage 128 via the original image processing circuit 112, the image processing circuit 116, the YUV conversion circuit 118, the image size reduction processing circuit 122, the JPEG encoding processing circuit 124 and the selector 126.

In the storage 128, the main image data and the sub image data are treated as image files independent of each other but are managed by being related to each other.

Thus, the two independent JPEG encoding circuits 120 and 124 are provided in order to produce two groups of image data from one photographed image. This arrangement is advantageous in terms of facility with which the system for storing data in the storage 128 is controlled. However, it has a drawback of increasing the circuit scale.

To enable image data stored in the storage 128 to be used in an external device (e.g., a computer), the storage medium in the storage 128 is removed and connected to the external device, or the image data is transferred to the external device through a communication cable (not shown). In either case, it is necessary for the external device to have an image expansion function in accordance with a compression format. If an encoding system generally used is used as encoding processing circuit 120, external devices can easily be provided with the corresponding expansion means. However, a special encoding system is often adopted as encoding processing circuit 120 by considering recording efficiency.

On the other hand, an image pickup apparatus has been proposed which produces a plurality of groups of image data that differ in image format and in encoding format from one photographed image, and which records the groups of image data on a recording medium together with link data which designates the relationship between the groups of image data (Japanese Patent Laid-Open Application No. 10-108133 (there is no corresponding foreign application)). In this case, the number of times photographed image data is read out from buffer memory 114 is increased.

In the above-described examples of the conventional art, it is necessary to read out data on a photographed image at least two times from buffer memory 114 in order to store in storage 128 groups of encoded data corresponding to the same photographed image.

If the number of times a photographed image is read out from buffer memory 114 increases, the time period through which the same photographed image is kept stored in buffer memory 114 is longer. This is virtually the same as a reduction in the capacity of buffer memory 114.

The continuous shooting ability of a camera is determined by the "virtual" storage capacity of buffer memory 114 and by the processing speed of original image processing circuit 112 and other following processing stages.

If the capacity of buffer memory 114 is increased or the processing speed of original image processing circuit 112, etc., is increased for the purpose of improving the continuous shooting ability, then a problem of an increase in power consumption arises.

This problem becomes more serious if the number of pixels of the image pickup device is increased.

SUMMARY OF THE INVENTION

In view of the above-described problems of the conventional art, an object of the present invention is to provide an image pickup apparatus having a hardware configuration on a smaller scale and capable of operating by a smaller power consumption.

To achieve this object, according to the present invention, there is provided an image processing apparatus comprising image pickup means for producing image data by photographing an image, first storage means for storing image data obtained by the image pickup means, size reduction means for reducing the size of the image data stored in the first storage means after reading out the image data, second storage means for storing, in a unit corresponding to a predetermined number of lines, the size-reduced image data obtained by the size reduction means, and single compression means for alternately performing, according to a predetermined switching timing, first compression processing to read out the image data stored in the first storage means and to compress the image data without reducing the size, and second compression processing to compress the size-reduced image data stored in the second storage means to obtain two kinds of compressed data representing one photographed image.

Other objects and features of the present invention will become apparent from the following detailed description of preferred embodiments of the invention in conjunction with the accompanying drawings.

BRIEF DESCRIPTION OF THE DRAWINGS

FIG. 2 is a diagram showing the configuration of a JPEG encoding processing circuit 22;

DESCRIPTION OF THE PREFERRED EMBODIMENTS

The preferred embodiments of the present invention will be described in detail with reference to the accompanying drawings.

(First Embodiment)

Figure 1:
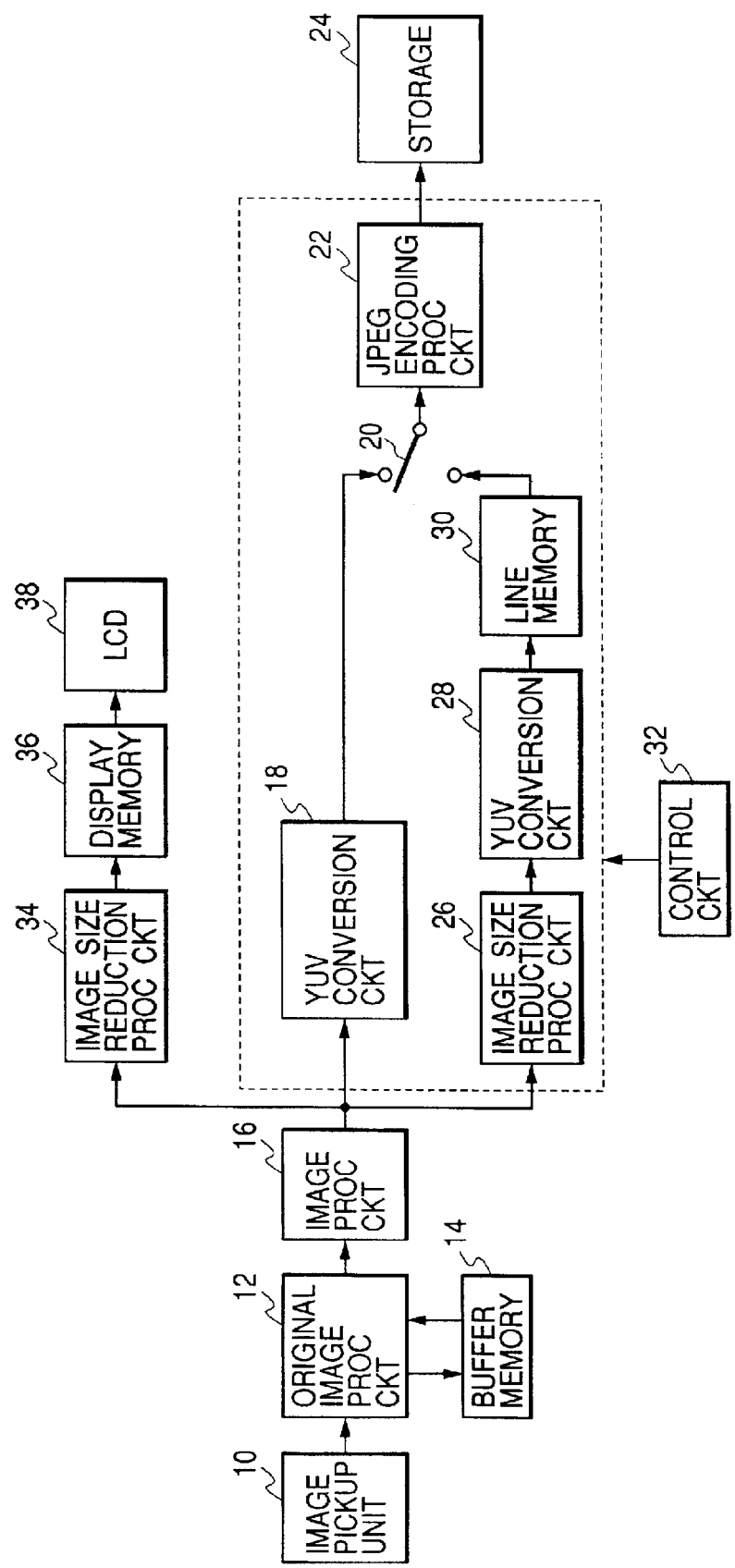
FIG. 1 is a diagram schematically showing the configuration of an apparatus which represents a first embodiment of the present invention.

FIG. 1 is a diagram schematically showing the configuration of an apparatus (digital camera) which represents a first embodiment of the present invention.

An image pickup unit 10 has a photographing lens, an image pickup device, and a circuit for driving the image pickup device. An optical image imaged by the photographing lens is converted into an electrical signal by the image pickup device. An original image processing circuit 12 converts the image signal from the image pickup unit 10 into a digital signal, performs, as a preparation to dark correction, extraction of pixel data from shaded portions and flaw position detection for flaw correction, and writes the signal to a buffer memory 14.

The buffer memory 14 has such a capacity as to be capable of storing an amount of data corresponding to a plurality of frames each read out as a unit amount of photography data from the image pickup device of the image pickup unit 10.

The capacity of the buffer memory 114 is set to a substantially large value such that the continuous shooting operation, i.e., repeating the photographing operation a certain number of times in a short time period, is not limited by the speed of processing in following stages (format conversion, compression coding, recording on a recording medium).

The original image processing circuit 12 reads out the image data stored in the buffer memory 14 and performs correction processing, e.g., processing for shading correction, dark correction processing based on the pixel data values of shaded portions extracted immediately before writing, and flaw correction processing based on flaw position detection information.

An image processing circuit 16 performs, on image data output from the original image processing circuit 12, a well-known processing such as white balancing, color interpolation processing, and pseudo color processing, and outputs processed data as R (red), G (green) and B (blue) components.

The amount of one-frame data output from the image processing circuit 16 increased by color interpolation processing is an integer multiple of the amount of data output from the original image processing circuit 12. The color filter of the image pickup device of the image pickup unit 10 has a Bayer array, and the image pickup device sequentially outputs pixel signals in one-horizontal-line units.

The data supplied from the original image processing circuit 12 to the image processing circuit 16 is also in the form corresponding to the Bayer array. The image processing circuit 16 processes the input contents in accordance with the Bayer array by color interpolation processing therein so that the input data is converted into data in independent-RGB format, that is, the amount of image data is tripled relative to the input, as described below in detail.

A YUV conversion circuit 18 converts RGB image data output from the image processing circuit 16 into data in YUV format, which forms a main image. A selector 20 is connected to an output terminal of the YUV conversion circuit 18. An output from the YUV conversion circuit 18 is supplied to a JPEG encoding processing circuit 22 via the selector 20. The JPEG encoding processing circuit 22 performs JPEG compression coding on image data supplied from the YUV conversion circuit 18.

The JPEG coding method itself is well-known and will not be described in detail in this specification. It is coding using DCT (discrete cosine transform), quantization, and Huffman coding.

The JPEG encoding processing circuit 22 in the present embodiment has, for DCT processing, the function of converting each of luminance data in a minimum unit corresponding to 8 (in vertical direction)×16 (in horizontal direction) pixels and a color difference component in a minimum unit corresponding to 8×8 pixels from raster scan form into zigzag scan form.

In the present embodiment, setting by a control circuit 32 of the compression rate in JPEG coding and various parameters to be referred to at the time of quantization and Huffman coding is completed before or when the shutter button is pressed. This setting may be automatically performed or may include a value set by a user.

A storage 24 successively stores compressed image data supplied from the JPEG encoding processing circuit 22 with respect to each of the above-mentioned coding units.

The above-described process is repeated to store in the storage 24 all the image data forming one frame. If necessary, the control circuit 32 adds attribute information, i.e., photography date information to the compressed image data of the main image compressed before and after JPEG coding, and stores the image data with attribute information in the storage 24.

On the other hand, to form a thumbnail or sub image, an image size reduction processing circuit 26 reduces the size of the image data output from the image processing circuit 16. For example, if the original image size is 4N×3N, the image size reduction processing circuit 26 reduces it to a size of 160×120 pixels.

A YUV conversion circuit 28 converts image data output from the image size reduction processing circuit 26 into data in YUV format and writes the converted data to a line memory 30.

The line memory 30 stores, in a line-group unit, the image data supplied from the YUV conversion circuit 28. The line memory 30 has such a capacity as to be capable of storing data forming the number of lines necessary for compression coding in the JPEG encoding processing circuit 22. For example, if the JPEG encoding processing circuit 22 processes luminance and color difference signals by DCT (discrete cosine transform), it is necessary to convert the luminance component in the minimum unit corresponding to 8 (in vertical direction)×16 (in horizontal direction) pixels from raster scan form into zigzag scan form, and the storage capacity of the line memory 22 is set to such a value as to enable storage of reduced image data corresponding to eight lines.

When the above-mentioned thumbnail image/sub image is JPEG compressed, the selector 20 changes the connection to the line memory 30 output side. The JPEG encoding processing circuit 22 then accesses the line memory 30 through the selector 20, takes in image data corresponding to eight lines stored in the line memory 30, and performs JPEG compression coding on the image data, as it does with respect to the main image. The JPEG encoding processing circuit 22 stores the processed data in the storage 24. In the storage 24, the compressed image data of the thumbnail image/sub image supplied from the JPEG encoding processing circuit 22 is stored in a predetermined place.

The thumbnail image/sub image stored in the predetermined place and the corresponding main image are managed by being related to each other.

The storage 24, in actuality, comprises a volatile storage medium capable of temporarily storing a plurality of image data groups and having a comparatively high writing speed, and a nonvolatile storage medium detachable and having a comparatively low writing speed. Data output from the JPEG encoding processing circuit 22 is first stored in the volatile storage medium. Thereafter, the data on the volatile storage medium is sequentially transferred from the volatile storage medium to the nonvolatile storage medium according to a suitable timing between photographing operations.

The nonvolatile storage medium of the storage 24 is detachable. After photographed image data has been transferred to the nonvolatile storage medium, the nonvolatile storage medium may be removed from the camera and connected to an apparatus (e.g., a computer) separate from the camera, thereby enabling the image data to be reproduced, edited, and stored in the apparatus.

The groups of encoded data forming the main and sub images corresponding to one photographed image can always be used in a state of being related to each other.

The control circuit 32 performs overall control of the embodiment apparatus and, in particular, controls the operations of the section constituted by the YUV conversion circuit 18, the selector 20, the JPEG encoding processing circuit 22, the image size reduction processing circuit 26, the YUV conversion circuit 28, and the line memory 30. The control circuit 32 is constituted by, for example, a one-chip microcomputer having a CPU (central processing unit), a RAM (random-access memory), a ROM (read-only memory), an EEPROM (electrically erasable programmable ROM), an input/output port, etc. The control circuit 32 controls a sequence of operations on the basis of a sequence program stored in the ROM.

An image size reduction processing circuit 34 reduces the size of the image data output from the image processing circuit 16 to the same size as that mentioned above with respect to the image size reduction processing circuit 26, and stores the reduced data in RGB format in a display memory 36.

The image data stored in the display memory 36 is read out at a constant rate to be supplied to a liquid crystal display panel 38, and an image based on this image data is displayed on the liquid crystal display panel 38. That is, the reduced image of the image photographed by the image pickup unit 10 can be displayed substantially in real time.

FIG. 2 is a diagram schematically showing the JPEG encoding processing circuit 22.

A raster block conversion circuit 40 converts raster data into zigzag scan data forming blocks of 8 (in vertical direction)×16 (in horizontal direction) pixels with respect to the luminance signal, and into zigzag scan data forming blocks of 8×8 pixels with respect to the color difference signal, and stores the zigzag scan data in a work register 42.

A DCT quantization processing circuit 44 converts the luminance and color difference data stored in the work register 42 by discrete cosine transform and quantizes and the converted data. An encoding processing circuit 46 scans in a zigzag manner the quantized values in the obtained blocks and performs Huffman coding of the scanned values. This DCT and Huffman coding, mentioned above, are well-known techniques and, therefore, will not be described in detail.

The control circuit 32 sets in advance coding parameters necessary for processing in the DCT quantization circuit 44 and the encoding processing circuit 46.

A plurality of coding parameters may be prepared in a selectable state in the DCT quantization circuit 44 and the encoding processing circuit 46, and the control circuit 32 may control the amount of compressed data by performing control for changing the coding parameters used in the DCT quantization circuit 44 and the encoding processing circuit 46 on the basis of certain criteria for controlling of the compressed data amount (the amount of compressed data after encoding, the memory capacity, the image quality of the original image, etc.).

Figure 3A:
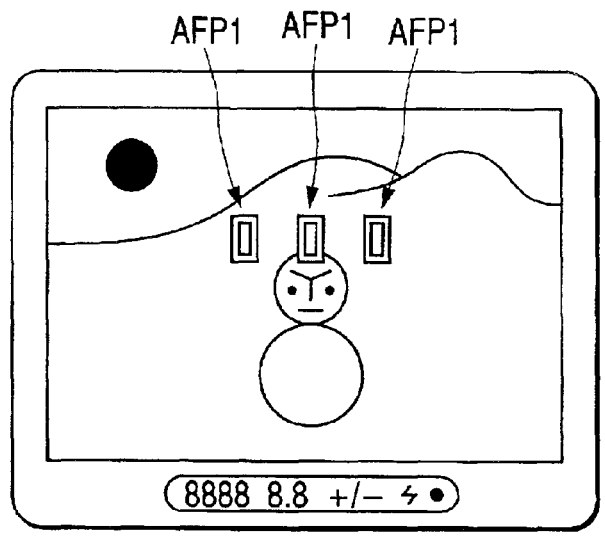
FIGS. 3A, 3B, and 3C are diagrams showing an example of an image viewed through a viewfinder and an example of a photographed image.
Figure 3B:
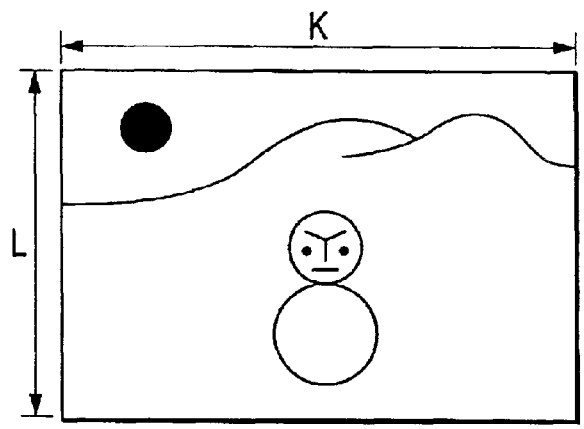
Figure 3C:
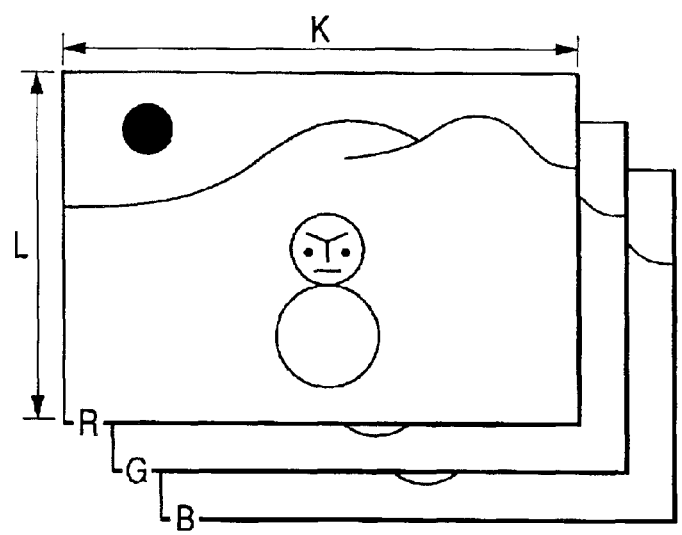

FIGS. 3A, 3B, and 3C show an example of an image (a photographed image) encoded in the present embodiment.

FIG. 3A shows an image viewed through a viewfinder from a camera ocular portion (not shown in FIG. 1). AFP1, AFP2, and AFP3 indicate three ranging points. In this case, the lens is focused at the ranging point AFP2.

FIG. 3B shows an image output from the image pickup device of the image pickup unit 10, and FIG. 3C shows an example of contents of the image after processing by the original image processing circuit 12 and the image processing circuit 16.

The size of the image output from the image pickup device is K×L pixels, as shown in FIG. 3B. The image processed by the original image processing circuit 12 and the image processing circuit 16 is formed of K×L pixels in each of colors R, G, and B. The amount of data is tripled as a result of processing by the original image processing circuit 12 and the image processing circuit 16.

As shown in FIG. 3A, information indicating camera setting conditions, i.e., the shutter speed, the result of in-focus determination in focusing, etc., is displayed in the finder. In FIG. 3A, all kinds of information are shown for explanation. Actually, the displayed/non-displayed state of each kind of information is selected according to operating conditions. When one of the ranging points AFP1, AFP2, and AFP3 is selected for ranging, an optical system and a lighting device (not shown) light the region defined between the outer and inner rectangles in red for a short time period such that the lighted state is sufficiently easily recognizable by the photographer.

Figure 4A:
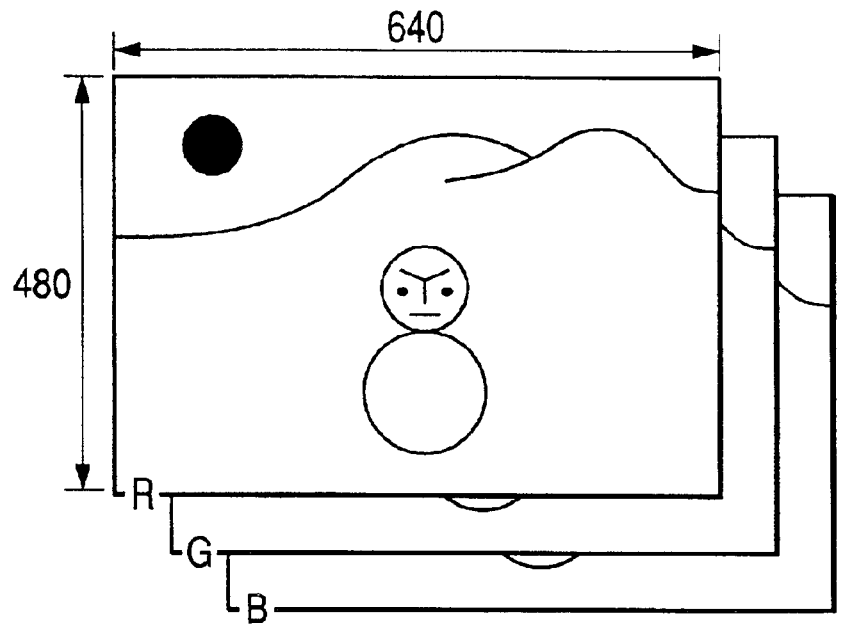
FIGS. 4A and 4B are diagrams respectively showing an example of the size of a main image and an example of the size of a thumbnail image.
Figure 4B:
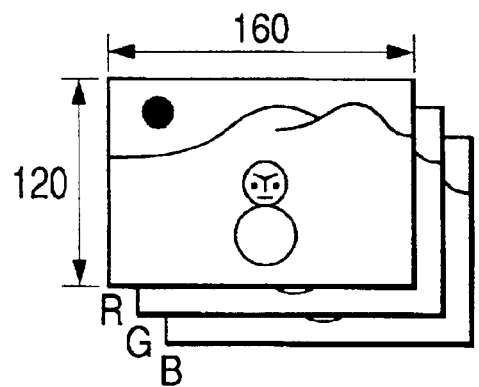

FIG. 4A shows an example of the main image size and FIG. 4B shows an example of the thumbnail image size. The main image size shown in FIG. 4A corresponds to the size of the frames of R-, G-, and B-images shown in FIG. 3C. In this case, K=640, and L=480.

If the size of R-, G-, and B-images output from the image processing circuit 16 is 640×480 pixels, the image size reduction processing circuit 26 reduces this size to the size of 160×120 pixels, as shown in FIG. 4B.

Figure 5:
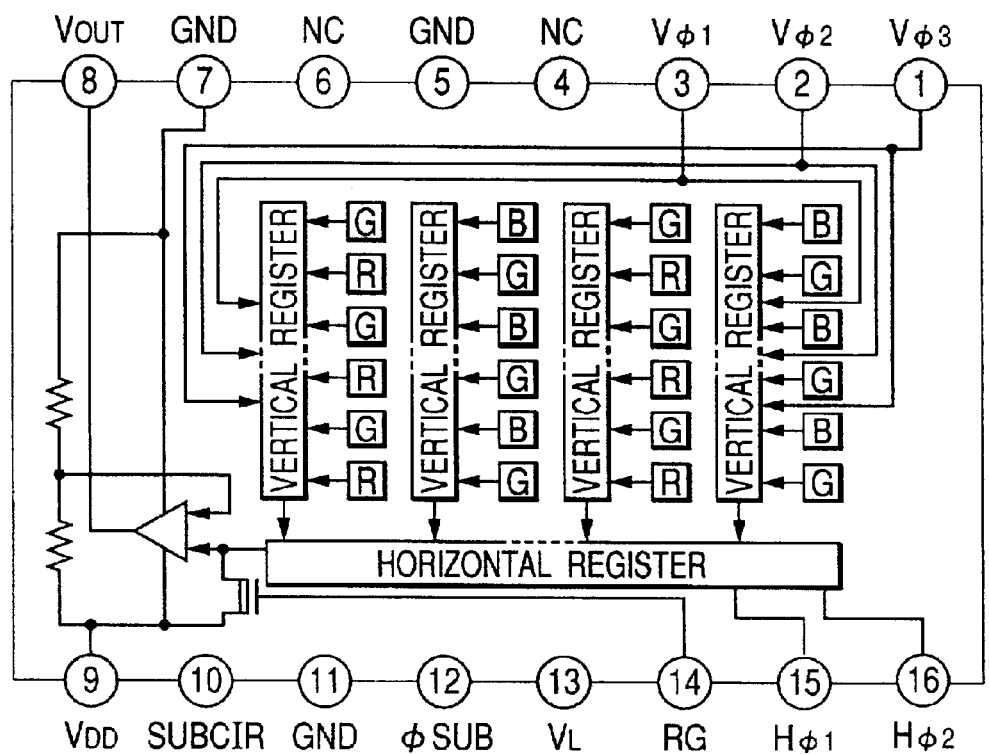
FIG. 5 is a diagram showing an example of the structure of an image pickup device of an image pickup unit 10.

FIG. 5 schematically shows the configuration of the CCD image pickup device in the image pickup unit 10.

The CCD image pickup device is a well-known Bayer array CCD in which filters having primary colors R, G, and B are placed over the light receiving surface of a photoelectric conversion device in such a manner that green portions are arrayed in a checkered pattern and red and blue portions are arranged in a line sequential manner. Square pixel areas are defined in a squire grid pattern to facilitate calculation of extracted image data.

FIGS. 6A to 6E and FIGS. 7A to 7D show the relationship between the operation of the selector 20 and times at which image data output from the image processing circuit 16 is input to the JPEG encoding processing circuit 22. FIGS. 6A, 6B, 6C, 6D, and 6E show the operation with respect a plurality of lines from line #1 to line #48 of 480 lines comprising the image data shown in FIGS. 4A and 4B, for example.

Figure 6:
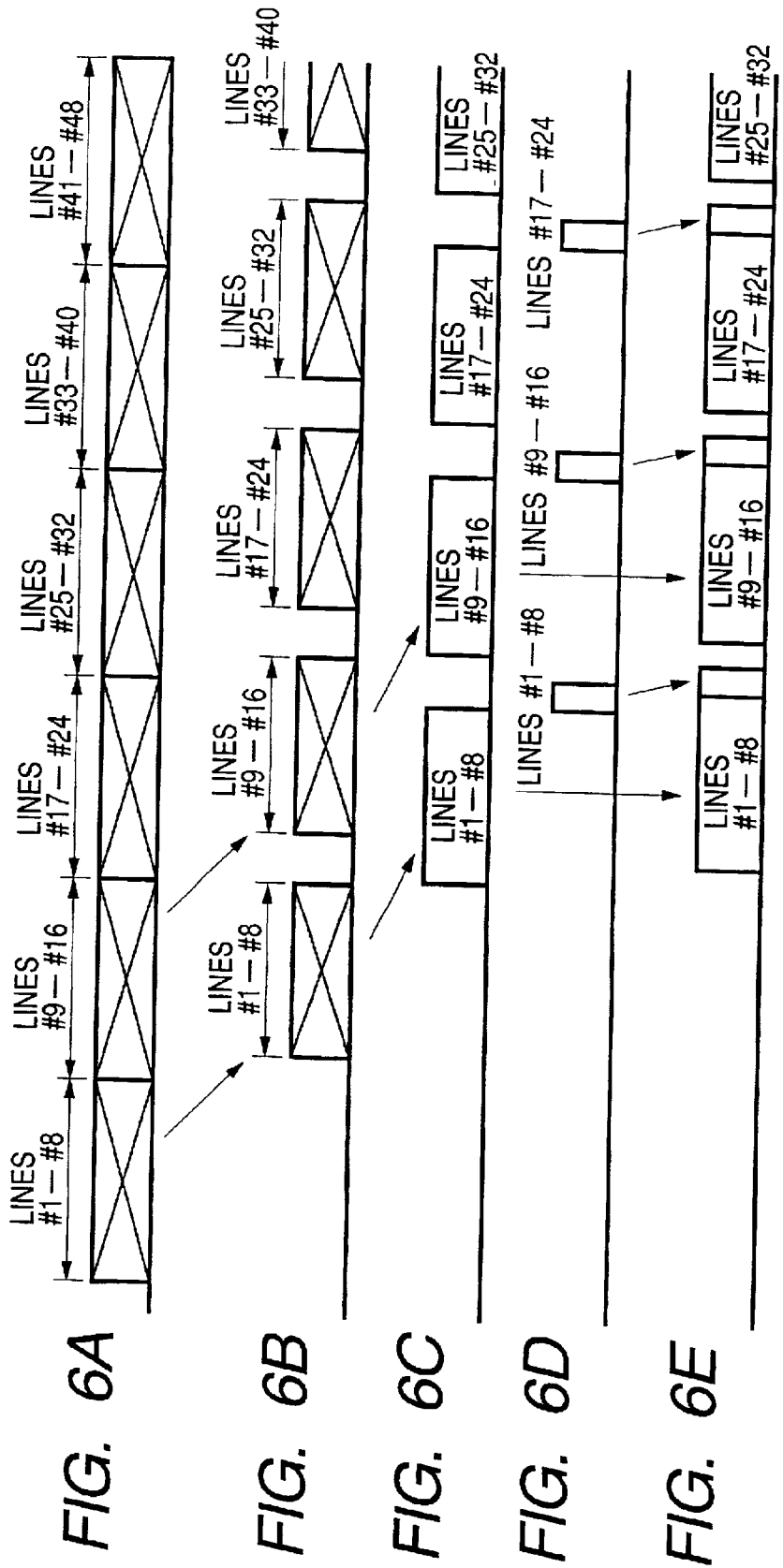
FIGS. 6A, 6B, 6C, 6D, and 6E are timing charts for explaining the operation of the first embodiment of the present invention.
Figure 7:
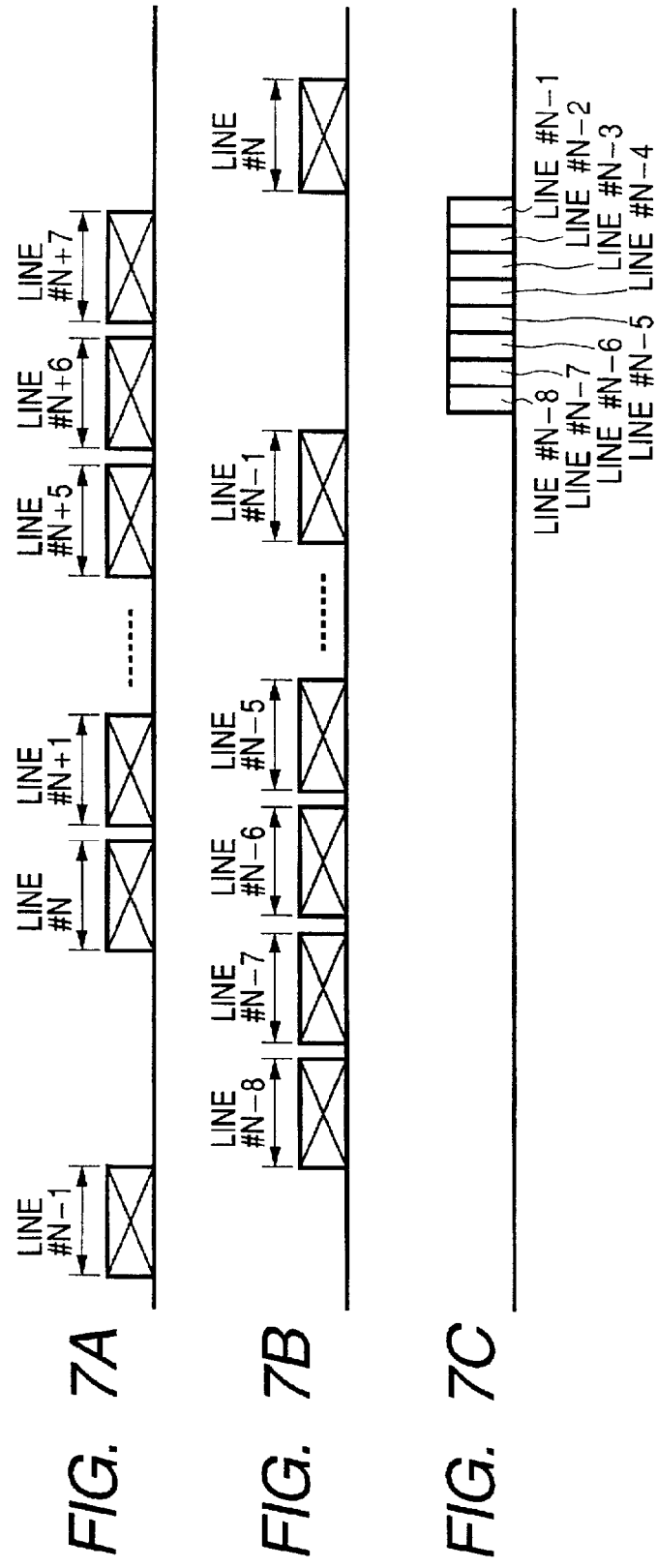
FIGS. 7A, 7B, and 7C are timing charts showing details of FIGS. 6B, 6C, 6D, and 6E.

FIG. 6A shows image data output from the image pickup unit 10; FIG. 6B image shows image data output from the original image processing circuit 12; FIG. 6C shows an output from the selector 20 with respect to the main image; FIG. 6D shows an output from the selector 20 with respect to the thumbnail image; and FIG. 6E shows an output from the JPEG encoding processing circuit 22. FIGS. 7A, 7B, and 7C respectively show details of data shown in FIGS. 6B, 6C, and 6D.

Arrows among FIGS. 6A to 6E indicate time transitions with data. Horizontal lines represent passage of time. Equal time periods required by the different stages to output data are indicated; a delay due to the preceding signal processing is included in the time period required by each stage from outputting of the first data item to outputting of the last data item.

While the image data shown in FIG. 6B is formed of RGB data, the image data shown in FIG. 6C is formed of luminance and color difference components. The amounts of these kinds of data are different from each other. Also, the data shown in FIG. 6E is image data compressed by JPEG coding, and the amount of data is determined according to details of the coding processing. The same applies to the relationship between the data shown in FIG., 6D and the corresponding data shown in FIG. 6E. Thus, the line processings shown in FIGS. 6B to 6E differ from each other.

The image data output from the image pickup unit 10 (FIG. 6A) is successively input in one-line units to the original image processing circuit 12. In FIGS. 6A to 6E, for ease of understanding, the data are illustrated by being sectioned by the amount corresponding to eight lines. The image data forming eight lines #1 to #8 is sequentially stored in the buffer memory after the above-described signal processing and is read out to undergo a sequence of correction processing including flaw correction and dark correction in the original image processing circuit 12.

FIG. 6A shows the image data after these kinds of correction processing. Since the original image processing circuit 12 outputs only necessary portions of the image data, e.g., image data obtained by removing optical black data or the like, the amount of data output from the original image processing circuit 12 is smaller than the amount of the corresponding input data.

The image processing circuit 16 performs the above-described kinds of processing on the image data supplied from the original image processing circuit 12 and a certain output delay results therefrom. The data output from the image processing circuit 16 is data in RGB format, so that the data amount is tripled. However, parallel processing of the R-, G-, and B-components is adopted to effectively limit the output delay.

The YUV conversion circuit 18 converts the image data output from the image processing circuit 16 into data in YUV format. Simultaneously, the selector 20 selects the output from the YUV conversion circuit 18. That is, the selector 20 selects the data forming lines #1 to #8 of the main image according to the timing shown in FIG. 6C.

The image size reduction circuit 26 reduces the image size of the same image data forming the lines #1 to line #8 supplied from the image processing circuit 16, and the data output from the image size reduction circuit 26 is converted by the YUV conversion circuit 28 into data in YUV format to be temporarily stored in the line memory 30. As shown in FIGS. 6C and 6D, the control circuit 32 switches the selector 20 so that the selector 20 selects the image data from the line memory 30 after selecting the YUV data forming lines #1 to #8 of the main image from the YUV conversion circuit 18. For ease of understanding of the correspondence, the image data shown in FIG. 6D is shown with the same line numbers as those of the original image, although in fact the number of lines is reduced.

The JPEG encoding processing circuit 22 processes the image data from the selector 20 (FIG. 6C) and the thumbnail/sub image data (FIG. 6D) in this order by compression coding, as shown in FIG. 6E, and stores the processed data in the storage 24. The control circuit 32 adds information to the two groups of compressed data in the storage 24 such that the two groups of compressed data can be managed as data obtained from the same photographed image data and can be treated as image files independent of each other.

Details of the data shown in FIGS. 6B, 6C, and 6D will be described with reference to FIGS. 7A to 7C. As shown in FIG. 7A, the original image processing circuit 12 outputs the image data forming line #(N−1) and, after a lapse of time corresponding to the time required to output the amount of data corresponding to two lines, successively outputs the sets of image data respectively forming lines #N to line #(N+7) with a small intermission between the sets of data.

This sequential outputting of data in the 8-line unit is repeated. If a set of data finally output is data forming a line before the eighth line in one line group, the original image processing circuit 12 outputs the data forming the preceding lines and this fractional-end line.

With respect to the main image, the selector 20 selects the output from the YUV conversion circuit 18 with a delay corresponding to the time period required for signal processing in the image processing circuit 16 and for conversion processing in the YUV conversion circuit 18, as shown in FIG. 7B.

With respect to the thumbnail image, the selector 20 selects the output from the line memory 30 after the image data forming line #(N−1) from the YUV conversion circuit 18 has been supplied to the JPEG encoding processing circuit 22, as shown in FIGS. 7B and 7C.

In the time period during which the selector 20 is in the state of selecting the image data forming lines #(N−8) to #(N−1) of the main image, processing in the image size reduction circuit 26 and the YUV conversion circuit 28 and writing to the line memory 30 can be completed.

In FIG. 7C, the image data shown in FIG. 7C is shown with the same line numbers as those of the corresponding main image for ease of understanding of the correspondence with the main image, as in FIG. 6D. Actually, since the image size is reduced, only the data indicated by the line numbers left after compression exists.

Apparently, it is possible to consider that the shooting interval is increased as a result of time base multiplexing of the main and thumbnail images from image data on one photographed image forming 480 lines. However, reading out the image data from the buffer memory one time suffices for forming the main and thumbnail images and the shooting interval can therefore be reduced.

Also, line memory 30 for a small number of lines may suffice in place of a frame memory for storing compressed thumbnail image data and it is, therefore, possible to reduce the circuit scale.

As described above, main image processing and thumbnail image/sub image processing are switched with respect to the unit data amount corresponding to a predetermined number of lines (e.g., eight lines) to enable the two kinds of image data to be efficiently encoded by one JPEG encoding processing circuit 22. Thus, the present invention makes it possible to reduce the shooting interval and to thereby enable even a low-cost camera to have a substantially high continuous shooting speed.

(Second Embodiment)

Figure 8:
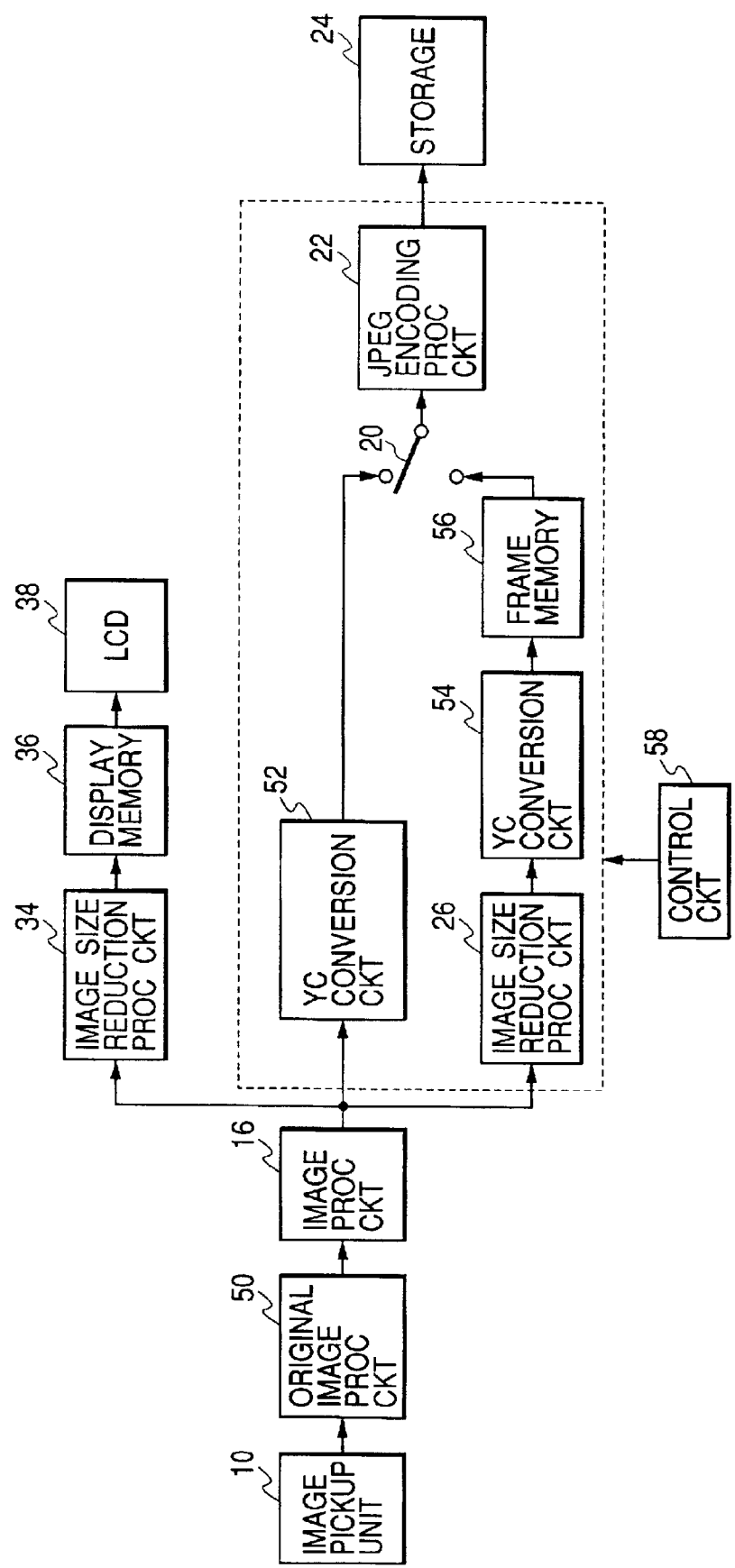
FIG. 8 is a diagram schematically showing the configuration of an apparatus which represents a second embodiment of the present invention.

FIG. 8 schematically shows the configuration of an apparatus which represents a second embodiment of the present invention.

The components having the same functions as those in the first embodiment are indicated by the same reference numerals.

A component 50 shown in FIG. 8 is an original image processing circuit having a line memory capable of storing image data forming a certain number of lines necessary for original image processing. Data which is output from this original image processing circuit 50 and supplied to the image processing circuit 16 is the same as data supplied from the original image processing circuit 12 to the image processing circuit 16.

In the present embodiment, YC conversion circuits 52 and 54 are provided in place of YUV conversion circuits 18 and 28, and a frame memory 56 is provided in place of the line memory 30. A control circuit 58 performs overall control of the embodiment shown in FIG. 2. The frame memory 56 does not require a large storage capacity since it is used to store image data on an image of a small size.

Figure 9:
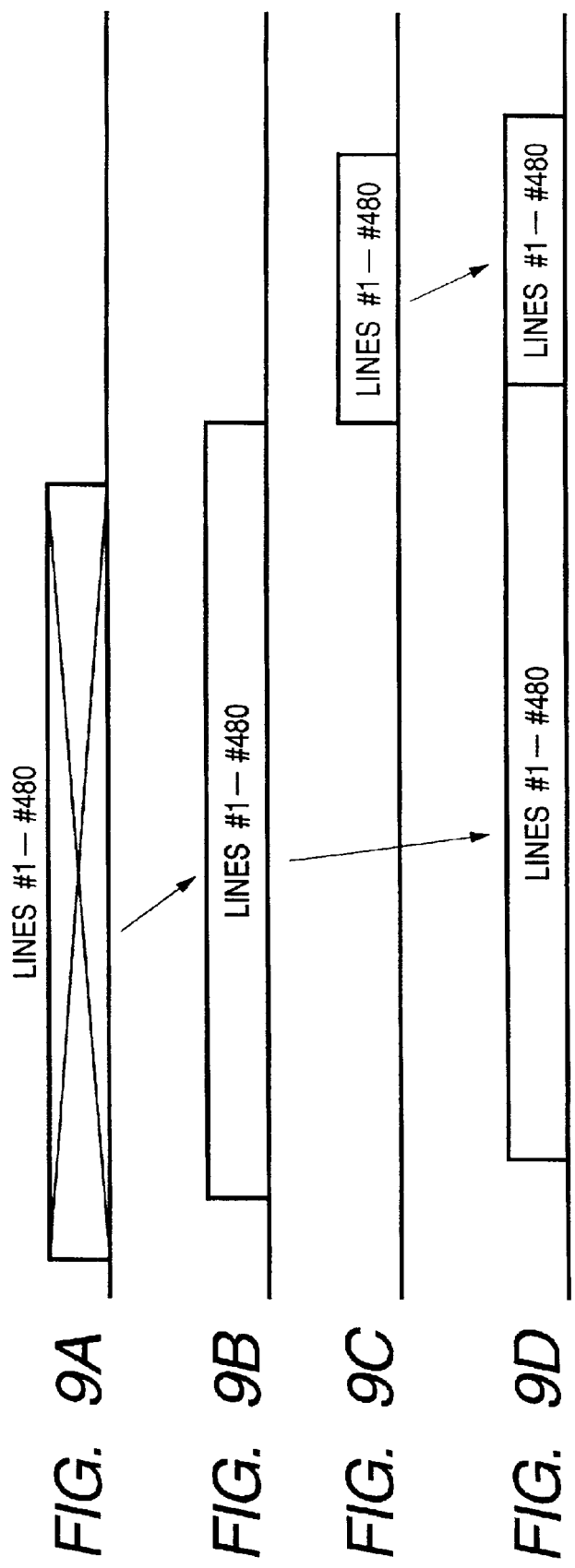
FIGS. 9A, 9B, 9C, and 9D are timing charts for explaining the operation of the second embodiment.

FIGS. 9A, 9B, 9C, and 9D are timing charts of the embodiment shown in FIG. 8. FIG. 9A shows image data output from the original image processing circuit 50, FIG. 9B shows data output from the selector 20 with respect to a main image, FIG. 9C shows data output from the selector 20 with respect to a thumbnail image, and FIG. 9D shows data output from the JPEG coding processing circuit 22.

In the embodiment shown in FIG. 8, the control circuit 58 connects the selector to the output of the YC conversion circuit 52 with respect to one frame of main image data, and thereafter connects the selector to the output of the frame memory 56 with respect to one frame of thumbnail image data. In this manner, the selector 20 is switched to select image data in one-frame units to enable the JPEG encoding processing circuit 22 to perform compression coding of the main and thumbnail images.

While the line memory 30 is replaced with the frame memory 56, the buffer memory 14 may be replaced with a line memory provided in the original image processing circuit 50 to reduce the memory capacity as a whole, thus reducing the manufacturing cost.

(Third Embodiment)

Figure 10:
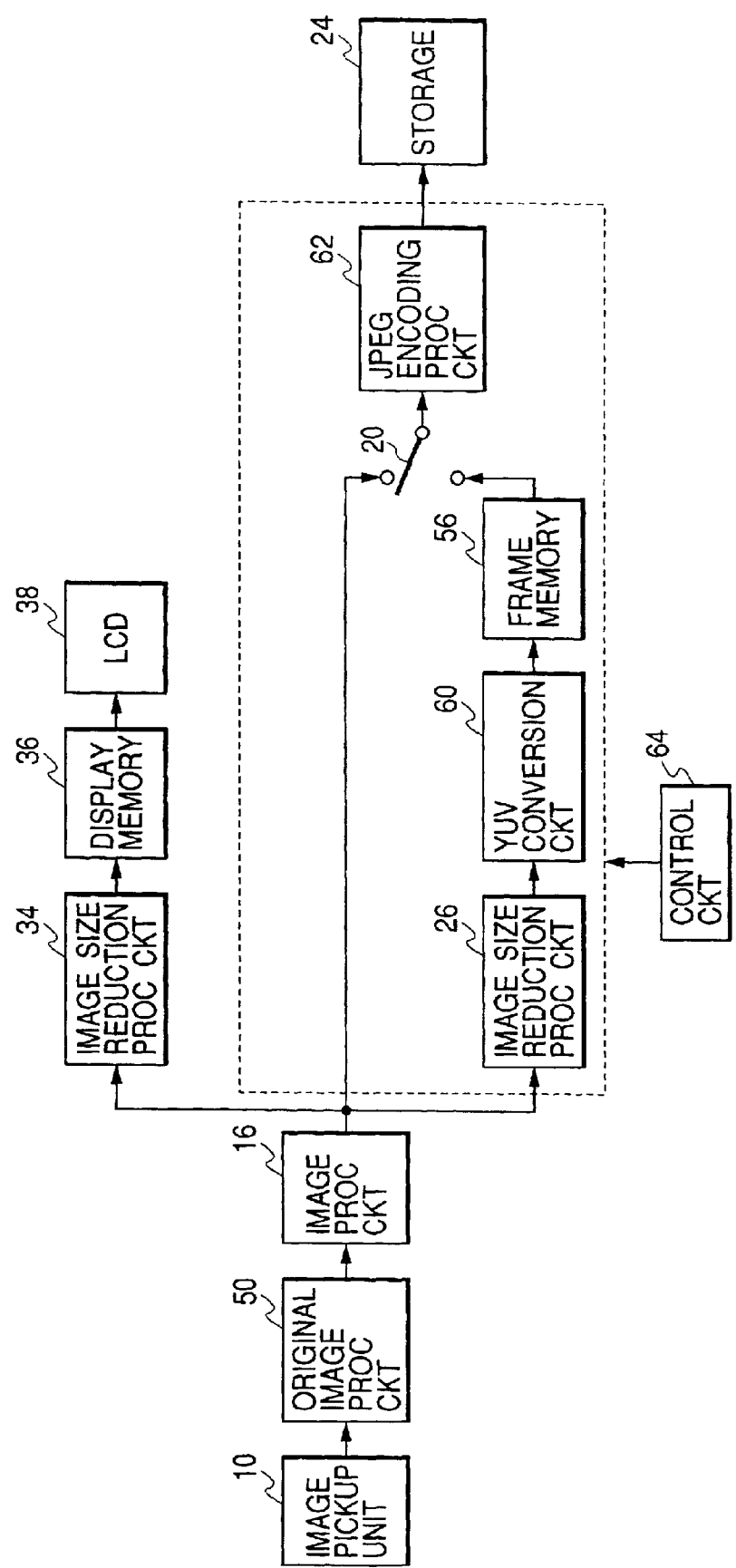
FIG. 10 is a diagram schematically showing the configuration of an apparatus which represents a third embodiment of the present invention.
Figure 11:
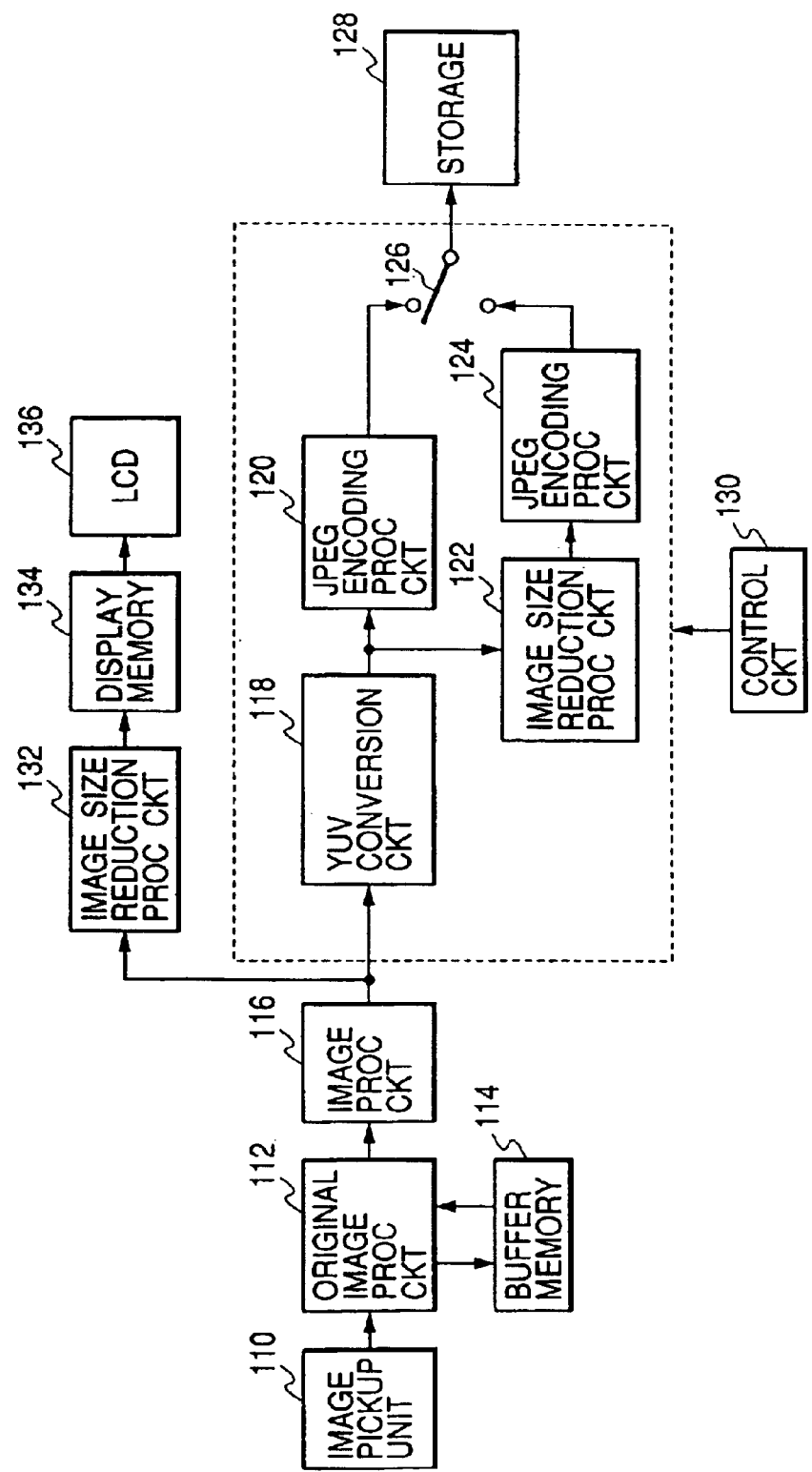
FIG. 11 is a diagram schematically showing the configuration of a conventional apparatus.

FIG. 10 schematically shows the configuration of an apparatus which represents a third embodiment of the present invention.

The components having the same functions as those in the embodiment shown in FIG. 8 are indicated by the same reference numerals.

The embodiment shown in FIG. 10 is formed in such a manner that, in the arrangement shown in FIG. 8, the YC conversion circuit 52 is removed, that is, replaced with a through path, the YC conversion circuit 54 is replaced with a YUV conversion circuit 60, and the JPEG encoding processing circuit 22 is replaced with a JPEG encoding processing circuit 62 capable of compression coding of main image data in RGB format as well as compression coding of thumbnail image data in YUV format. A control circuit 64 for overall control may have substantially the same functions as the control circuit 58.

In the embodiment shown in FIG. 10, a main image is encoded in RGB format by compression coding while a thumbnail image is encoded in YUV format by compression coding. The control circuit 64 sets coding parameters in the JPEG coding processing circuit 62 according to the main and thumbnail images.

The present invention is not limited to the configurations of the above-described embodiments. For example, the JPEG encoding processing circuit may be supplied with a signal other than that in accordance with the RGB format and that in accordance with the luminance/color difference format. The image pickup device is not limited to the CCD image pickup device. The selector 20 may be used to select three or more kinds of images one by one.

The present invention can be applied to any optical apparatus other than digital cameras if it processes an image signal obtained by two-dimensional scanning and photoelectric conversion and finally outputs the processed signal to an output unit, e.g., a monitor or a printer.

According to the present invention, to form a thumbnail image from image data on one photographed image, a certain amount of data corresponding to a minimum unit amount necessary for JPEG coding is temporarily stored in a line memory prepared in a stage before a JPEG coding stage and the data stored in the line memory is processed by JPEG coding each time the line memory becomes full of data, thus enabling effective use of the time period during which optical black and dummy pixels included in photography data are read. As a result, the continuous shooting performance can be improved. Also, since a plurality of different kinds of image data are encoded by one JPEG coding processing means, the configuration of the processing apparatus can be simplified.

A frame memory may be used in place of the line memory to enable main and thumbnail image/sub images to be sequentially processed in one-frame units. Thus, the need for a buffer memory from which image data on one photographed image is read out two or more times can be eliminated.

According to the present invention, as can be easily understood from the foregoing, it is possible to simply configure a processing apparatus capable of efficiently producing a plurality of kinds of compressed image data from data on one image in a short time period.

The present invention can be modified in various ways within the scope of the invention set forth in the appended claims.

What is claimed is:

1. An image processing apparatus comprising:
   an image pickup unit, adapted to produce image data by photographing an image;
   a first storage unit, adapted to store image data obtained by said image pickup unit;
   a compression unit, adapted to compress the image data in units of n lines;
   a size reduction unit, adapted to reduce the size of the image data stored in said first storage unit;
   an image supply unit, adapted to supply the image data stored in said first storage unit to said compression unit and said size reduction unit in parallel without reducing the size of the image data; and
   a second storage unit, adapted to store the size-reduced image data obtained by said size reduction unit,
   wherein, so as to input and compress the image data not reduced and to temporarily input and compress the size-reduced image data of the n lines when the storage of the size-reduced image data of the n lines into said second storage unit ends, said compression unit switches the two inputs.

2. An apparatus according to claim 1, wherein said size reduction unit includes a unit adapted to convert the format of the image data.

3. An apparatus according to claim 1, wherein said compression unit performs JPEG coding.

4. An image processing apparatus according to claim 1, wherein said image processing apparatus includes a digital camera.

5. An image processing apparatus comprising:
   a first storage unit, adapted to store input image data;
   a compression unit, adapted to compress the image data in units of n lines;
   a size reduction unit, adapted to reduce the size of the image data stored in said first storage unit;
   an image supply unit, adapted to supply the image data stored in said first storage unit to said compression unit and said size reduction unit in parallel without reducing the size of the image data; and
   a second storage unit, adapted to store the size-reduced image data obtained by said size reduction unit,
   wherein, so as to input and compress the image data not reduced and to temporarily input and compress the size-reduced image data of the n lines when the storage of the size-reduced image data of the n lines into said second storage unit ends, said compression unit switches the two inputs.

6. An image processing apparatus according to claim 5, wherein said image processing apparatus includes a digital camera.

7. An image processing method comprising:
   an image pickup step, of producing image data by photographing an image;
   a first storage step, of storing image data obtained in said image pickup step into a first memory;
   a compression step, of compressing the image data in units of n lines;
   a size reduction step, of reducing the size of the image data stored in said first storage step;
   an image supply step, of supplying the image data stored in said first storage step to said compression step and said size reduction step in parallel without reducing the size of the image data; and
   a second storage step, of storing the size-reduced image data obtained in said size reduction step into a second memory,
   wherein, so as to input and compress the image data not reduced and to temporarily input and compress the size-reduced image data of the n lines when the storage of the size-reduced image data of the n lines in said second storage step ends, said compression step includes switching the two inputs.

8. A method according to claim 7, wherein said size reduction step includes converting the format of the image data.

9. A method claim 7, wherein said compression step includes performing JPEG coding.

10. An image processing method according to claim 7, wherein said steps are executed by a digital camera.

11. An image processing method comprising:
    a first storage step, of storing input image data into a first memory;
    a compression step, of compressing the image data in units of n lines;

a size reduction step, of reducing the size of the image data stored in said first storage step;

an image supply step, of supplying the image data stored in said first storage step to said compression step and said size reduction step in parallel without reducing the size of the image data; and a second storage step, of storing the size-reduced image data obtained in said size reduction step into a second memory, wherein, so as to input and compress the image data not reduced and to temporarily input and compress the size-reduced image data of the n lines when the storage of the size-reduced image data of the n lines in said second storage step ends, said compression step includes switching the two inputs.

12. An image processing method according to claim 11, wherein said steps are executed by a digital camera.

* * * * *

UNITED STATES PATENT AND TRADEMARK OFFICE
CERTIFICATE OF CORRECTION

PATENT NO. : 6,990,240 B2
APPLICATION NO. : 09/886113
DATED : January 24, 2006
INVENTOR(S) : Shinichi Hagiwara It is certified that error appears in the above-identified patent and that said Letters Patent is hereby corrected as shown below:

ON THE TITLE PAGE ITEM [56] REFERENCES CITED:
    Foreign Patent Documents, "10108133" should read --10-108133--.

COLUMN 1:
    Line 51, "A" should read --An--.

COLUMN 7:
    Line 1, "and" should be deleted.

COLUMN 8:
    Line 1, "squire" should read --square--;
    Line 7, "respect" should read --respect to--;
    Line 45, "processing" should read --processings--; and
    Line 48, "processing." should read --processings.--

COLUMN 12:
    Line 59, "method" should read --method according to--.

Signed and Sealed this

Twelfth Day of December, 2006

JON W. DUDAS
*Director of the United States Patent and Trademark Office*